US012183281B2

(12) United States Patent
He et al.

(10) Patent No.: US 12,183,281 B2
(45) Date of Patent: Dec. 31, 2024

(54) DISPLAY PANEL AND DISPLAY METHOD THEREOF, AND DISPLAY APPARATUS

(71) Applicants: Hefei BOE Joint Technology Co., Ltd., Anhui (CN); BOE Technology Group Co., Ltd., Beijing (CN)

(72) Inventors: Min He, Beijing (CN); Xiaolong Wei, Beijing (CN); Song Meng, Beijing (CN); Qiang Fei, Beijing (CN); Jingbo Xu, Beijing (CN); Cheng Xu, Beijing (CN); Miao Liu, Beijing (CN); Pengfei Yin, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/034,374

(22) PCT Filed: Jun. 29, 2022

(86) PCT No.: PCT/CN2022/102404
§ 371 (c)(1),
(2) Date: Apr. 27, 2023

(87) PCT Pub. No.: WO2024/000279
PCT Pub. Date: Jan. 4, 2024

(65) Prior Publication Data
US 2024/0321198 A1 Sep. 26, 2024

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2300/0819* (2013.01);
(Continued)

(58) Field of Classification Search
CPC ......... G09G 2300/0819; G09G 3/3233; G09G 2300/0842; G09G 3/2096; G09G 2320/103
See application file for complete search history.

(56) References Cited

U.S. PATENT DOCUMENTS

2012/0044372 A1 2/2012 Cote et al.
2017/0098407 A1* 4/2017 Jeong .................. G09G 3/3258
(Continued)

FOREIGN PATENT DOCUMENTS

CN 107039004 A 8/2017
CN 109545134 A 3/2019
(Continued)

*Primary Examiner* — Muhammad N Edun
(74) *Attorney, Agent, or Firm* — Ling Wu; Stephen Yang; Ling and Yang Intellectual Property

(57) ABSTRACT

Disclosed are a display panel and a display method thereof, and a display apparatus. The display panel includes multiple pixel units, a pixel unit includes multiple sub-pixels, a sub-pixel includes a pixel drive circuit, a sense compensation circuit, and an element to be driven, and the display panel further includes a detection unit and a compensator; the pixel drive circuit is configured to drive the element to be driven in active time; the sense compensation circuit is configured to sense electrical characteristics of the element to be driven in blank time; the detection unit is configured to detect whether a currently displayed picture is a still picture, send a first notification to the compensator when the currently displayed picture is a still picture, and send a second notification to the compensator when the currently displayed picture is a non-still picture.

20 Claims, 6 Drawing Sheets

(52) U.S. Cl.
CPC ............... *G09G 2300/0842* (2013.01); *G09G 2320/103* (2013.01)

(56) References Cited

U.S. PATENT DOCUMENTS

| | | | | |
|---|---|---|---|---|
| 2020/0175923 | A1 | 6/2020 | Kim et al. | |
| 2020/0388228 | A1 | 12/2020 | Oh et al. | |
| 2021/0272495 | A1 | 9/2021 | Park et al. | |
| 2022/0122545 | A1* | 4/2022 | Hong | G09G 3/3233 |
| 2022/0130332 | A1* | 4/2022 | Ok | G09G 3/3233 |
| 2023/0029708 | A1 | 2/2023 | Chen | |

FOREIGN PATENT DOCUMENTS

| | | | |
|---|---|---|---|
| CN | 111105764 | A | 5/2020 |
| CN | 111243529 | A | 6/2020 |
| CN | 111369934 | A | 7/2020 |
| CN | 111508432 | A | 8/2020 |
| CN | 111933089 | A | 11/2020 |
| CN | 112369006 | A | 2/2021 |
| KR | 20170006350 | A | 1/2017 |
| TW | I513298 | B | 12/2015 |
| WO | 2006087327 | A1 | 8/2006 |

* cited by examiner

DISPLAY PANEL AND DISPLAY METHOD THEREOF, AND DISPLAY APPARATUS

CROSS-REFERENCE TO RELATED APPLICATION

The present application is a U.S. National Phase Entry of International Application No. PCT/CN2022/102404 having an international filing date of Jun. 29, 2022. The entire contents of the above-identified application are hereby incorporated by reference.

TECHNICAL FIELD

Embodiments of the present disclosure relate to, but are not limited to, the field of display technologies, and particularly to a display panel and a display method thereof, and a display apparatus.

BACKGROUND

An Organic Light Emitting Diode (OLED) is an active light emitting display device, which has advantages of luminescence, ultra-thinness, a wide angle of view, high brightness, a high contrast ratio, relatively low power consumption, and an extremely high response speed, etc. Depending upon drive modes, OLEDs may be divided into two types of OLEDs, i.e., a Passive Matrix (PM) type OLED and an Active Matrix (AM) type OLED. An AMOLED is a current driven device in which an independent Thin Film Transistor (TFT) is used for controlling each sub-pixel, and each sub-pixel may be continuously and independently driven to emit light.

SUMMARY

The following is a summary of subject matters described herein in detail. The summary is not intended to limit the protection scope of claims.

An embodiment of the present disclosure provides a display panel, including a plurality of pixel units, at least one pixel unit includes a plurality of sub-pixels, at least one sub-pixel includes a pixel drive circuit, a sense compensation circuit, and an element to be driven, the display panel further includes: a detection unit and a compensator.

The pixel drive circuit is configured to drive the element to be driven to emit light in active time.

The sense compensation circuit is configured to sense electrical characteristics of the element to be driven in blank time.

The detection unit is configured to detect whether a currently displayed picture is a still picture, and send a first notification to the compensator when the currently displayed picture is a still picture; and send a second notification to the compensator when the currently displayed picture is a non-still picture.

The compensator is configured to compensate the currently displayed picture according to a sense result of the sense compensation circuit in the blank time of the currently displayed picture upon receiving the first notification, and not compensate the currently displayed picture according to the sense result of the sense compensation circuit in the blank time of the currently displayed picture upon receiving the second notification.

An embodiment of the present disclosure also provides a display apparatus, which includes the display panel according to any embodiment of the present disclosure.

An embodiment of the present disclosure also provides a display method of a display panel, the display panel includes a plurality of pixel units, at least one pixel unit includes a plurality of sub-pixels, at least one sub-pixel includes a pixel drive circuit, a sense compensation circuit, and an element to be driven, the display panel further includes: a detection unit and a compensator, the display method includes: detecting, by the detection unit, whether a currently displayed picture is a still picture, sending a first notification to the compensator when the currently displayed picture is a still picture, and sending a second notification to the compensator when the currently displayed picture is a non-still picture; compensating, by the compensator, the currently displayed picture according to a sense result of the sense compensation circuit in blank time of the currently displayed picture when the compensator receives the first notification; not compensating, by the compensator, the currently displayed picture according to the sense result of the sense compensation circuit in the blank time of the currently displayed picture when the compensator receives the second notification.

Other aspects may be comprehended upon reading and understanding drawings and detailed description.

BRIEF DESCRIPTION OF DRAWINGS

The accompanying drawings are used for providing understanding of technical solutions of the present disclosure, and constitute a part of the specification. They are used for explaining the technical solutions of the present disclosure together with the embodiments of the present disclosure, but do not constitute limitations on the technical solutions of the present disclosure.

DETAILED DESCRIPTION

Figure 1:
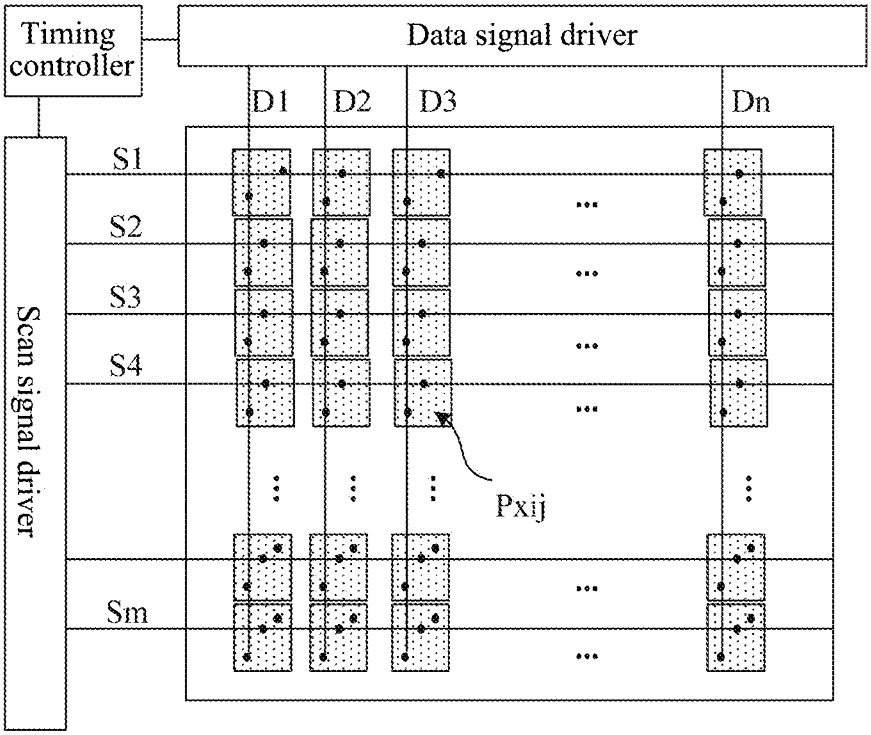
FIG. 1 is a schematic diagram of a structure of a display apparatus.

To make objectives, technical solutions, and advantages of the present disclosure clearer, the embodiments of the present disclosure will be described in detail with reference to the accompanying drawings. Implementation modes may be implemented in a plurality of different forms. Those of ordinary skills in the art may easily understand such a fact that modes and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

Scales of the drawings in the present disclosure may be used as a reference in an actual process, but are not limited thereto. For example, a width-length ratio of a channel, a thickness and a pitch of each film layer, and a width and a pitch of each signal line may be adjusted according to actual needs. A quantity of pixels in a display panel and a quantity of sub-pixels in each pixel are not limited to numbers shown in the drawings. The drawings described in the present disclosure are structural schematic diagrams only, and one mode of the present disclosure is not limited to shapes, numerical values, or the like shown in the drawings.

Ordinal numerals such as “first”, “second”, and “third” in the specification are set to avoid confusion of constituent elements, but not to set a limit in quantity.

In the specification, for convenience, wordings indicating orientation or positional relationships, such as “middle”, “upper”, “lower”, “front”, “back”, “vertical”, “horizontal”, “top”, “bottom”, “inside”, and “outside”, are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements are changed as appropriate according to directions for describing various constituent elements. Therefore, appropriate replacements may be made according to situations without being limited to the wordings described in the specification.

In the specification, unless otherwise specified and defined explicitly, terms “mount”, “mutually connect”, and “connect” should be understood in a broad sense. For example, it may be a fixed connection, a detachable connection, or an integrated connection; it may be a mechanical connection or an electrical connection; it may be a direct mutual connection, or an indirect connection through middleware, or internal communication between two elements. Those of ordinary skill in the art may understand specific meanings of these terms in the present disclosure according to specific situations.

In the specification, a transistor refers to an element which includes at least three terminals, i.e., a gate electrode, a drain electrode, and a source electrode. The transistor has a channel region between the drain electrode (drain electrode terminal, drain region, or drain) and the source electrode (source electrode terminal, source region, or source), and a current can flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, a first electrode may be a source electrode, and a second electrode may be a drain electrode. In a case that transistors with opposite polarities are used, in a case that a direction of a current is changed during operation of a circuit, or the like, functions of the “source electrode” and the “drain electrode” are sometimes interchangeable. Therefore, the “source electrode” and the “drain electrode”, as well as a “source terminal” and a “drain terminal”, are interchangeable in the specification.

In the specification, an “electrical connection” includes a case that constituent elements are connected together through an element with a certain electrical effect. The “element with the certain electrical effect” is not particularly limited as long as electrical signals may be sent and received between the connected constituent elements. Examples of the “element with the certain electrical effect” not only include electrodes and wirings, but also include switching elements such as transistors, resistors, inductors, capacitors, and other elements with various functions, etc.

In the specification, “parallel” refers to a state in which an angle formed by two straight lines is above −10° and below 10°, and thus also includes a state in which the angle is above −5° and below 5°. In addition, “perpendicular” refers to a state in which an angle formed by two straight lines is above 80° and below 100°, and thus also includes a state in which the angle is above 85° and below 95°.

In the specification, a “film” and a “layer” are interchangeable. For example, a “conductive layer” may be replaced with a “conductive film” sometimes. Similarly, an “insulation film” may be replaced with an “insulation layer” sometimes.

A triangle, rectangle, trapezoid, pentagon, or hexagon, etc. in this specification is not strictly defined, and it may be an approximate triangle, rectangle, trapezoid, pentagon, or hexagon, etc. There may be some small deformation caused by tolerance, and there may be a chamfer, an arc edge, and deformation, etc.

In the present disclosure, “about” refers to that a boundary is not defined so strictly and numerical values within process and measurement error ranges are allowed.

FIG. 1 is a schematic diagram of a structure of a display apparatus. As shown in FIG. 1, the display apparatus may include a timing controller, a data signal driver, a scan signal driver, and a pixel array. The timing controller is connected with the data signal driver and the scan signal driver respectively, the data signal driver is connected with multiple data signal lines (D1 to Dn) respectively, and the scan signal driver is connected with multiple scan signal lines (S1 to Sm) respectively. The pixel array may include multiple sub-pixels Pxij, wherein i and j may be natural numbers. At least one sub-pixel Pxij may include a circuit unit and a light emitting device connected with the circuit unit, wherein the circuit unit may include at least one scan signal line, at least one data signal line, and a pixel drive circuit. In an exemplary implementation mode, the timing controller may provide a gray scale value and a control signal suitable for a specification of the data signal driver to the data signal driver, and may provide a clock signal, a scan start signal, and the like suitable for a specification of the scan signal driver to the scan signal driver. The data signal driver may generate a data voltage to be provided to the data signal lines D1, D2, D3, . . . , and Dn by using the gray scale value and the control signal that are received from the timing controller. For example, the data signal driver may sample the gray scale value using a clock signal and apply a data voltage corresponding to the gray scale value to the data signal lines D1 to Dn by taking a pixel row as a unit, wherein n may be a natural number. The scan signal driver may receive the clock signal, the scan start signal, and the like from the timing controller to generate a scan signal to be provided to the scan signal lines S1, S2, S3, . . . , and Sm. For example, the scan signal driver may sequentially provide a scan signal with an on-level pulse to the scan signal lines S1 to Sm. For example, the scan signal driver may be constructed in a form of a shift register and generate a scan signal in a manner of sequentially transmitting a scan start signal provided in a form of an on-level pulse to a next-stage circuit under control of the clock signal, wherein m may be a natural number.

Figure 2:
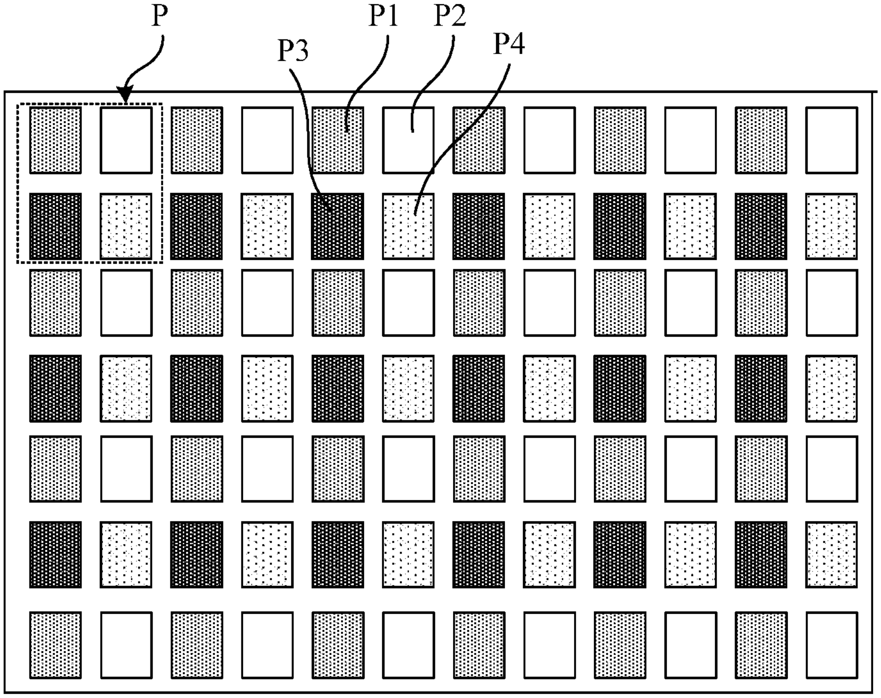
FIG. 2 is a schematic diagram of a planar structure of a display panel.

FIG. 2 is a schematic diagram of a planar structure of a display panel. As shown in FIG. 2, the display panel may include multiple pixel units P arranged in a matrix, at least one of the multiple pixel units P includes a first sub-pixel P1 emitting light of a first color, a second sub-pixel P2 emitting light of a second color, and a third sub-pixel P3 emitting light of a third color light, and a fourth sub-pixel P4 emitting light of a fourth color. The four sub-pixels may each include a circuit unit and a light emitting device, wherein the circuit unit may include a scan signal line, a data signal line, and a pixel drive circuit. The pixel drive circuit is respectively electrically connected with the scan signal line and the data signal line, and the pixel drive circuit is configured to receive a data voltage transmitted by the data signal line and output a corresponding current to the light emitting device, under control of the scan signal line. The light emitting device in each sub-pixel is connected with a pixel drive circuit of a sub-pixel where the light emitting device is located, and is configured to emit light with corresponding brightness in response to a current output by the pixel drive circuit of the sub-pixel where the light emitting device is located.

In an exemplary implementation mode, the first sub-pixel P1 may be a red sub-pixel (R) emitting red light, the second sub-pixel P2 may be a green sub-pixel (G) emitting green light, the third sub-pixel P3 may be a white sub-pixel (W) emitting white light, and the fourth sub-pixel P4 may be a blue sub-pixel (B) emitting blue light.

In an exemplary implementation mode, a shape of a sub-pixel may be a rectangle, a rhombus, a pentagon, or a hexagon. In an exemplary implementation mode, the four sub-pixels may be arranged in a horizontal side-by-side manner to form an RWBG pixel arrangement. In another exemplary implementation mode, the four sub-pixels may be arranged in a square, diamond, vertical side-by-side manner, or the like, which is not limited here in the present disclosure.

In an exemplary implementation mode, multiple sub-pixels sequentially arranged in a horizontal direction are referred to as a pixel row, and multiple sub-pixels sequentially arranged in a vertical direction are referred to as a pixel column; multiple pixel rows and multiple pixel columns together constitute a pixel array arranged in an array.

Figure 3:
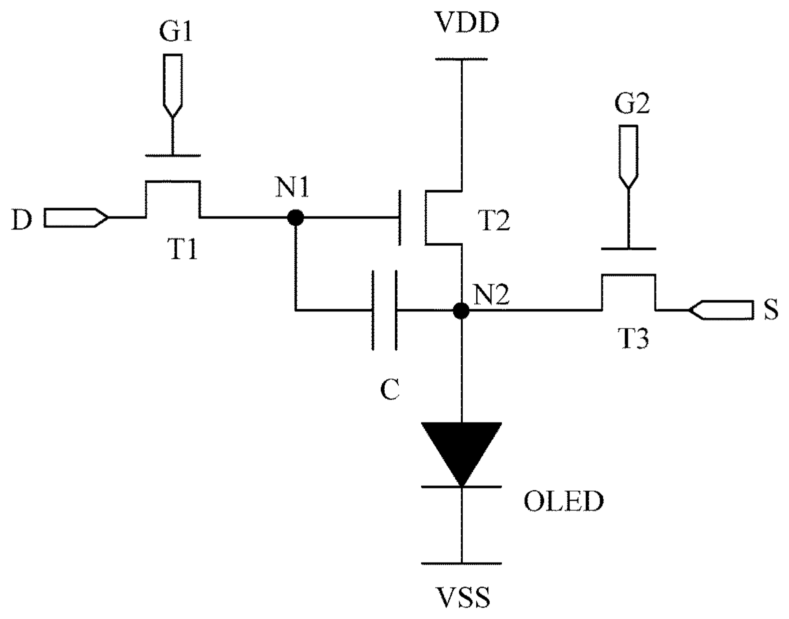
FIG. 3 is a schematic diagram of an equivalent circuit of a pixel drive circuit.

In an exemplary implementation mode, the pixel drive circuit may have a structure of 3T1C, 4T1C, 5T1C, 5T2C, 6T1C, 7T1C, or 8T1C. FIG. 3 is a schematic diagram of an equivalent circuit of a pixel drive circuit. As shown in FIG. 3, the pixel drive circuit has a 3T1C structure, and may include three transistors (a first transistor T1, a second transistor T2, and a third transistor T3), one storage capacitor C, and six signal lines (a data signal line D, a first scan signal line G1, a second scan signal line G2, a compensation signal line S, a first power supply line VDD, and a second power supply line VSS).

In an exemplary implementation mode, the first transistor T1 is a switching transistor, the second transistor T2 is a drive transistor, and the third transistor T3 is a compensation transistor. A first electrode of the storage capacitor C is coupled with a control electrode of the second transistor T2, a second electrode of the storage capacitor C is coupled with a second electrode of the second transistor T2, and the storage capacitor C is configured to store a potential of the control electrode of the second transistor T2. A control electrode of the first transistor T1 is coupled to the first scan signal line G1, a first electrode of the first transistor T1 is coupled to the data signal line D, a second electrode of the first transistor T1 is coupled to the control electrode of the second transistor T2. The first transistor T1 is configured to receive a data signal transmitted by the data signal line D under control of the first scan signal line G1, so that the control electrode of the second transistor T2 receives the data signal. The control electrode of the second transistor T2 is coupled to the second electrode of the first transistor T1, a first electrode of the second transistor T2 is coupled to the first power supply line VDD, the second electrode of the second transistor T2 is coupled to a first electrode (anode) of a light emitting device, and the second transistor T2 is configured to generate a corresponding current at the second electrode under control of the data signal received by the control electrode of the second transistor. A control electrode of the third transistor T3 is coupled to the second scan signal line G2, a first electrode of the third transistor T3 is coupled to the compensation signal line S, a second electrode of the third transistor T3 is coupled to the second electrode of the second transistor T2. The third transistor T3 is configured to extract a threshold voltage Vth and a mobility rate of the second transistor T2 in response to compensation timing, so as to compensate the threshold voltage Vth. A second electrode (cathode) of the light emitting device is connected with the second power supply line VSS.

In an exemplary implementation mode, the light emitting device may be an OLED, including a first electrode (anode), an organic emitting layer, and a second electrode (cathode) that are stacked. The first electrode of the OLED is coupled to the second electrode of the second transistor T2, the second electrode of the OLED is coupled to the second power supply line VSS, and the OLED is configured to emit light with corresponding brightness in response to the current of the second electrode of the second transistor T2.

In an exemplary implementation mode, a signal of the first power supply line VDD is a high-level signal continuously provided, and a signal of the second power supply line VSS is a low-level signal. The first transistor T1 to the third transistor T3 may be P-type transistors or may be N-type transistors. Use of a same type of transistors in a pixel drive circuit may simplify a process flow, reduce process difficulties of a display panel, and improve a yield of products.

In an exemplary implementation mode, for the first transistor T1 to the third transistors T3, low temperature poly silicon thin film transistors may be adopted, oxide thin film transistors may be adopted, or a low temperature poly silicon thin film transistor and an oxide thin film transistor may be adopted. An active layer of a low temperature poly silicon thin film transistor is made of Low Temperature Poly Silicon (LTPS for short), and an active layer of an oxide thin film transistor is made of an oxide. The low temperature poly silicon thin film transistor has advantages of a high mobility rate, fast charging, and the like, and the oxide thin film transistor has advantages of a low leakage current and the like. In an exemplary implementation mode, a low temperature poly silicon thin film transistor and an oxide thin film transistor may be integrated on one display panel to form a Low Temperature Polycrystalline Oxide (LTPO for short) display panel, so that advantages of the two may be utilized, high Pixel Per Inch (PPI for short) and low-frequency drive may be achieved, power consumption may be reduced, and display quality may be improved. In an exemplary implementation mode, the light emitting device may be an Organic Light Emitting Diode (OLED), including a first electrode (anode), an organic emitting layer, and a second electrode (cathode) that are stacked.

Time of each frame of an OLED display device is divided into active display time (active time) and blank time. In the active time, the OLED display device performs normal data output display by using a pixel drive circuit, and in the blank time, the OLED display device performs external real time sense compensation (real time sense) by using a sense compensation circuit. The OLED display device compensates in real time in the blank time of each frame, senses a change of TFT characteristics of a panel device, and then improves quality of a displayed picture through external compensation. However, if contents of the displayed picture are switched frequently, or data of adjacent frames of the displayed picture are quite different, stability of a charging voltage for real time compensation in the blank time will be affected adversely, which results in fluctuation in data of a sense result and leads to visible fine lateral stripes in a compensated picture.

Figure 4:
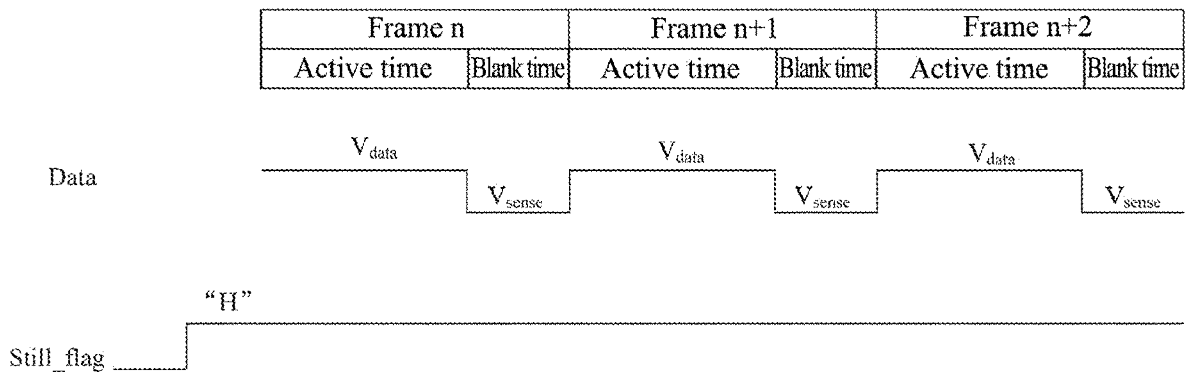
FIG. 4 is a schematic diagram of real time sense voltage output under a still picture.

As shown in FIG. 4, when a currently displayed picture is a still picture (a still picture flag bit Still_flag=H), display data of an n-th frame, an (n+1)-th frame, and an (n+2)-th frame are the same, and at this time, a sense voltage $V_{sense}$ output by the data signal line D is stable in the blank time, and a compensation effect is good.

Figure 5:
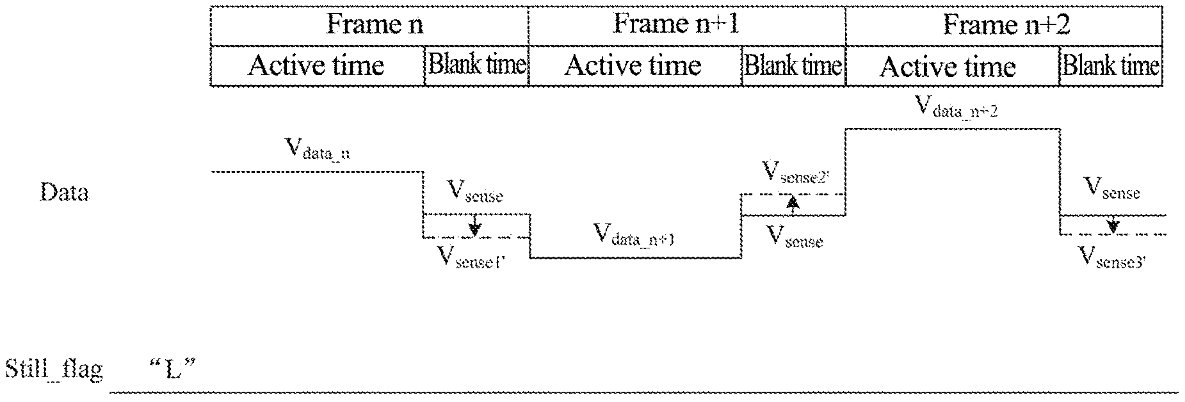
FIG. 5 is a schematic diagram of real time sense voltage output under a non-still picture.

As shown in FIG. 5, when a currently displayed picture is a non-still picture (a still picture flag bit Still_flag=L), display data of an n-th frame, an (n+1)-th frame, and an (n+2)-th frame are Vdata n, Vdata n+1, and Vdata n+2 respectively. At this time, although the data signal line D gives a stable output sense voltage $V_{sense}$ in the blank time, due to a change of display data between adjacent frames, a sense voltage $V_{sense}$ in each frame has jitter, and a sense voltage $V_{sense}$ in the n-th frame, the (n+1)-th frame, and the (n+2)-th frame becomes $V_{sense1'}$, $V_{sense2'}$, and $V_{sense3'}$ respectively after being interfered, so that a sense result is also biased, resulting in visible lateral fine stripes in a compensated picture.

Figure 6:
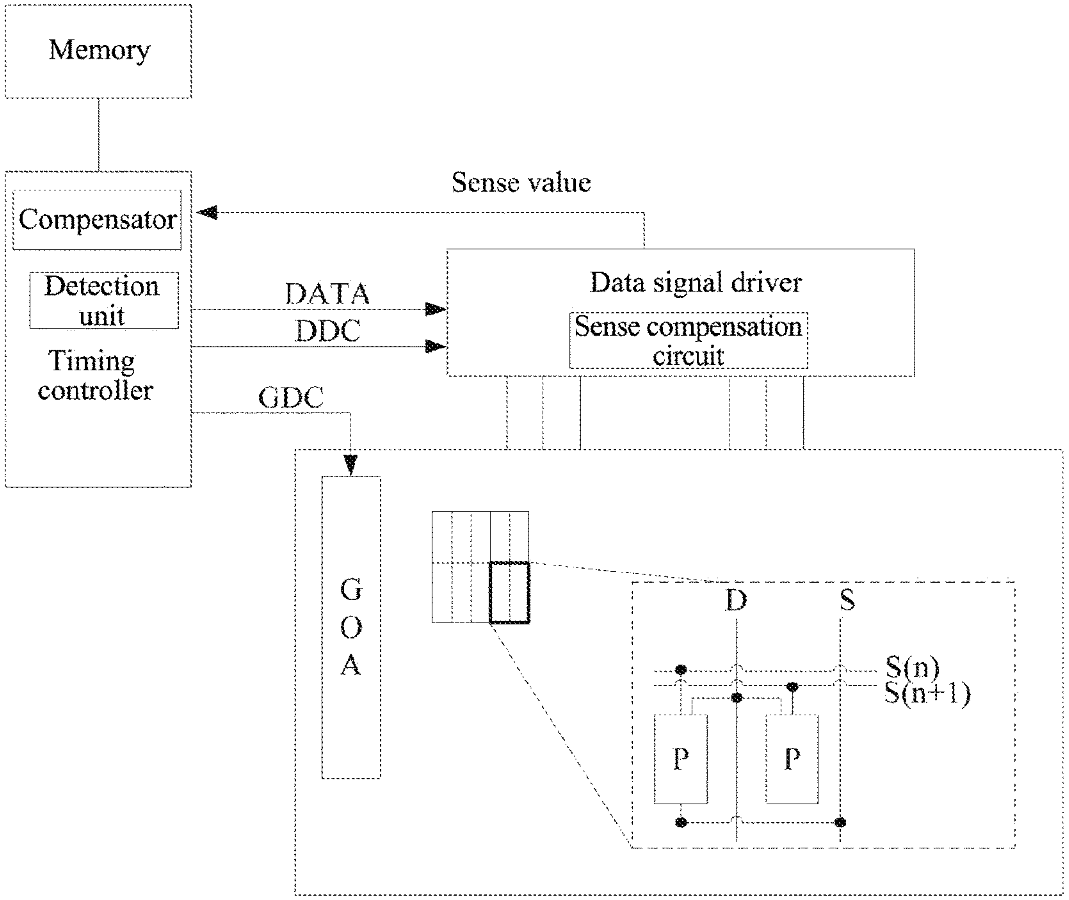
FIG. 6 is a schematic diagram of a structure of a display panel according to an exemplary embodiment of the present disclosure.

As shown in FIG. 6, an embodiment of the present disclosure provides a display panel including a plurality of pixel units P, at least one pixel unit P includes a plurality of sub-pixels, at least one sub-pixel includes a pixel drive circuit (not shown in the figure), a sense compensation circuit (not shown in the figure), and an element to be driven (not shown in the figure), the display panel further includes a detection unit and a compensator, wherein the pixel drive circuit is configured to drive the element to be driven to emit light in active time; the sense compensation circuit is configured to sense electrical characteristics of the element to be driven in blank time; the detection unit is configured to detect whether a currently displayed picture is a still picture, and when the currently displayed picture is a still picture, send a first notification to the compensator; when the currently displayed picture is a non-still picture, send a second notification to the compensator; the compensator is configured to compensate the currently displayed picture according to a sense result of the sense compensation circuit in the blank time of the currently displayed picture upon receiving the first notification, and not to compensate the currently displayed picture according to a sense result of the sense compensation circuit in the blank time of the currently displayed picture upon receiving the second notification.

In the display panel according to the embodiment of the present disclosure, it is determined whether a displayed picture is a still picture during a display process, and if the displayed picture is a still picture, real time sense compensation is performed, otherwise, real time sense compensation is not performed, or, only real time sense is performed and compensation data is not updated to maintain accuracy of real time sense compensation data, which may effectively shield a phenomenon of fine lateral stripes in the displayed picture after compensation due to picture transformation.

Figure 7:
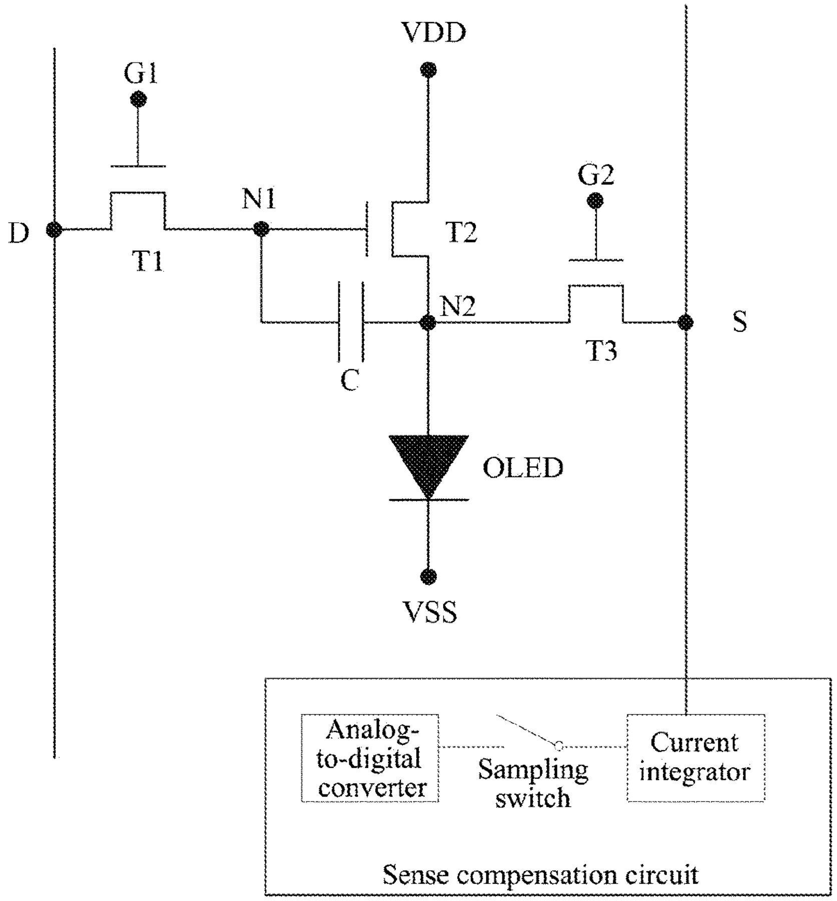
FIG. 7 is a schematic diagram of a connection relationship between a pixel drive circuit and a sense compensation circuit according to an exemplary embodiment of the present disclosure.

FIG. 7 is a schematic diagram of a connection relationship between a pixel drive circuit and a sense compensation circuit according to an exemplary embodiment of the present disclosure. The pixel drive circuit in FIG. 7 is of a 3T1C structure and includes three transistors (a first transistor T1, a second transistor T2, and a third transistor T3) and one storage capacitor C, however, the embodiment of the present disclosure is not limited thereto, and the pixel drive circuit may also include other numbers of transistors and storage capacitors. The pixel drive circuit is configured to receive a data voltage transmitted by a data signal line and output a corresponding current to an element to be driven under control of a scan signal line.

In some exemplary implementation modes, as shown in FIG. 7, the sense compensation circuit is connected with a compensation signal line S for acquiring an amount of charge flowing through the element to be driven within preset sense time (i.e., blank time), so that an external compensator calculates a compensation gain value of the element to be driven based on the acquired amount of charge.

In some exemplary implementation modes, the compensator does not compensate a currently displayed picture according to a sense result of the sense compensation circuit in the blank time, including following four cases.

In a first case, the sense compensation circuit does not sense electrical characteristics of the element to be driven in the blank time of the currently displayed picture, and at this time, the compensator may compensate according to compensation data that has not been updated.

In a second case, the sense compensation circuit does not sense the electrical characteristics of the element to be driven in the blank time of the currently displayed picture, and the compensator may not compensate at this time.

In a third case, the sense compensation circuit senses the electrical characteristics of the element to be driven in the blank time of the currently displayed picture, however, the compensator does not compensate the currently displayed picture according to a sense result of the sense compensation circuit in the blank time of the currently displayed picture. At this time, the compensator may compensate according to compensation data that has not been updated.

In a fourth case, the sense compensation circuit senses the electrical characteristics of the element to be driven in the blank time of the currently displayed picture, however, the compensator does not compensate the currently displayed picture according to a sense result of the sense compensation circuit in the blank time of the currently displayed picture. At this time, the compensator may not compensate.

In the embodiment of the present disclosure, the compensation data that has not been updated may be a sense result of the sense compensation circuit in non-blank time before the currently displayed picture.

Figure 8:
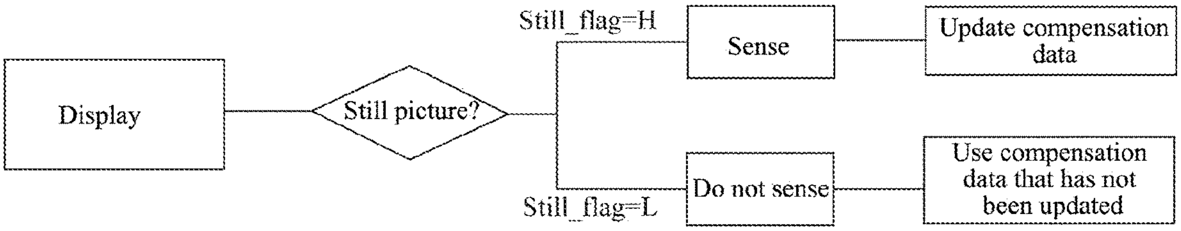
FIG. 8 is a display flowchart of a display panel according to an exemplary embodiment of the present disclosure.

FIG. 8 is a display flowchart of a display panel according to an embodiment of the present disclosure. As shown in FIG. 8, when a display apparatus displays, it is determined whether a current picture is a still picture, if it is a still picture, real time sense is performed, and compensation data is updated after the sense is completed; if the current picture is a non-still picture, t real time sense is not performed and compensation data that has not been updated is still used for compensation. This may effectively prevent a problem of lateral fine stripes in a compensated displayed picture due to deviation of a real time sense result caused by a large data difference between adjacent frames during a display process.

Figure 9:
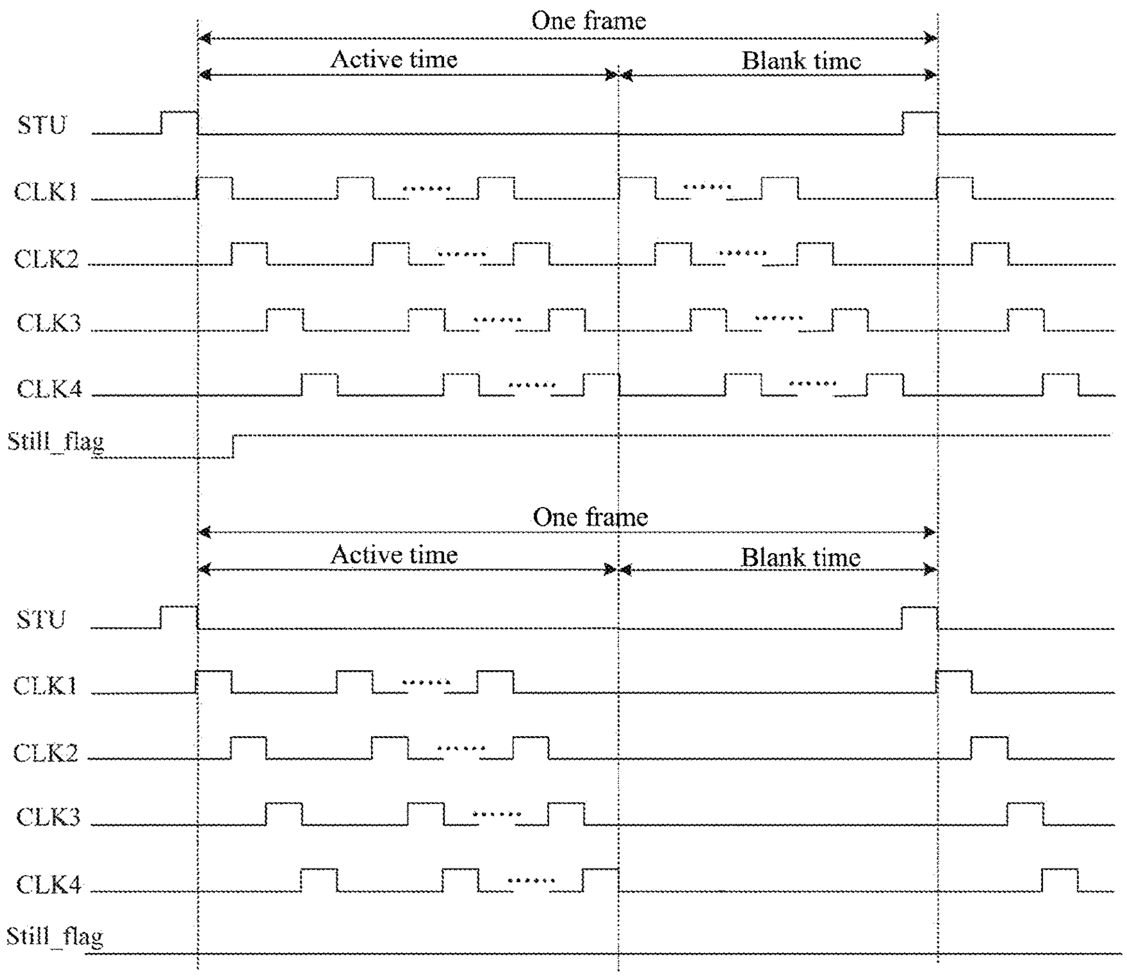
FIG. 9 is a Gate Driver on Array (GOA) clock timing waveform diagram corresponding to a display flow shown in FIG. 8.

A GOA clock timing waveform corresponding to this technical solution is shown in FIG. 9, where STU is a start flag bit of each frame, CLK1~CLK4 are a group of GOA clocks, Still_flag is a still picture determination flag bit, Still_flag is determined as "H" in still picture, and vice versa as "L". When the currently displayed picture is a still picture, the sense compensation circuit senses the electrical characteristics of the element to be driven in blank time of the currently displayed picture, and the compensator compensates the currently displayed picture according to a sense result of the sense compensation circuit in the blank time of the currently displayed picture; when the currently displayed picture is a non-still picture, the sense compensation circuit does not sense the electrical characteristics of the element to be driven in the blank time of the currently displayed picture, and the compensator compensates the currently displayed picture using compensation data that has not been updated.

Figure 10:
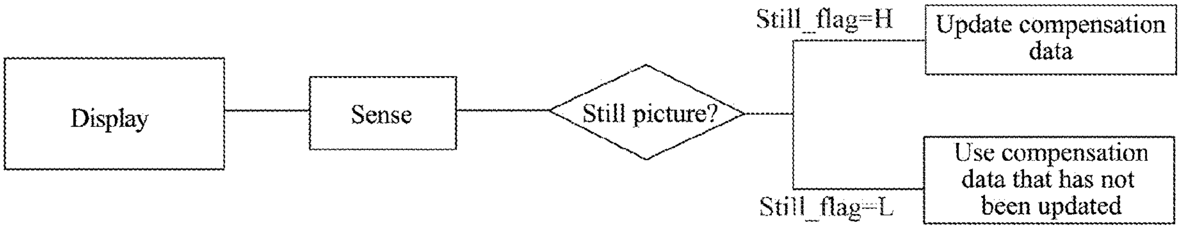
FIG. 10 is a display flowchart of another display panel according to an exemplary embodiment of the present disclosure.

FIG. 10 is a display flowchart of another display panel according to an embodiment of the present disclosure, as shown in FIG. 10, during display, real time sense is performed in blank non-display time of each frame, and still picture determination is performed at the same time. If a still picture is displayed, compensation data is updated, and if a non-still picture is displayed, the compensation data is not updated, and compensation data before updating is still used. This solution of this embodiment may also achieve a purpose of preventing a problem of lateral fine stripes in a compensated displayed picture due to deviation of a real time sense result caused by a large data difference between adjacent frames during a display process.

In the embodiment of the present disclosure, when the first case is used, the detection unit may send a third notification to a timing controller, and the timing controller receives the third notification and adjusts a clock signal timing output to a scan signal driver so that the sense compensation circuit does not sense in blank time. When the second case is used, the sense compensation circuit senses the electrical characteristics of the element to be driven in blank time of the currently displayed picture, however, the compensator does not compensate the currently displayed picture according to a sense result of the sense compensation circuit in the blank time of the currently displayed picture. At this time, the detection unit does not need to inform the timing controller to change the output clock signal timing, and the timing controller still outputs to the scan signal driver according to a previously set clock signal timing.

In some exemplary implementation modes, the display panel further includes a timing controller, a scan signal driver, and a data signal driver.

The detection unit is further configured to send a third notification to the timing controller when the currently displayed picture is a non-still picture.

The timing controller is configured to output a clock signal and a scan start signal to the scan signal driver, and output a first data signal to the data signal driver, and is further configured to receive the third notification and adjust a clock signal timing output to the scan signal driver such that the sense compensation circuit does not sense in the blank time of the currently displayed picture.

The data signal driver is configured to receive a first data signal output by the timing controller, convert the first data signal into a data voltage for charging a pixel of a pixel unit and output the data voltage to a plurality of data lines.

The scan signal driver is configured to receive the clock signal and the scan start signal output by the timing controller, generate a scan signal according to the received clock signal and scan start signal, and output the scan signal to a plurality of scan signal lines.

In some exemplary implementation modes, the scan signal driver may include a plurality of cascaded GOA circuits.

In some exemplary implementation modes, as shown in FIG. 7, the sense compensation circuit includes a current integrator, a sampling switch, and an analog-to-digital converter.

One end of the current integrator is connected with the compensation signal line S, and the other end of the current integrator is connected with a first path end of the sampling switch.

A second path end of the sampling switch is connected with a first end of the analog-to-digital converter, and a control end of the sampling switch receives a sampling signal.

A second end of the analog-to-digital converter is connected with the compensator.

In some exemplary implementation modes, the compensator compensates the currently displayed picture according to the sense result of the sense compensation circuit in the blank time of the currently displayed picture, including following operations.

According to an amount of charge flowing through the element to be driven within preset sense time (i.e., the blank time of the currently displayed picture), the compensator calculates a voltage difference value corresponding to the amount of charge.

The compensator obtains a compensation gain value of the element to be driven according to the calculated voltage difference value.

In some exemplary implementation modes, as shown in FIG. 6, the display panel further includes a memory, the memory is configured to store a first sense result, and the first sense result is a sense result of the sense compensation circuit in non-blank time before the currently displayed picture.

When receiving the second notification, the compensator is further configured to: detect whether the memory stores the first sense result; compensate the currently displayed picture using the first sense result when the first sense result is stored in the memory.

In other exemplary implementation modes, when receiving the second notification, the compensator is further configured to: detect whether the memory stores the first sense result; not compensate the currently displayed picture when the memory does not store the first sense result.

In some exemplary implementation modes, the first sense result may be a sense result at startup, a sense result at shutdown, a sense result at user-specified time.

In the embodiment of the present disclosure, in a startup operation stage of the display apparatus, the detection unit may determine whether it is necessary to perform startup detection on electric compensation parameters of the display apparatus; when startup detection needs to be performed on the electric compensation parameters of the display apparatus, following startup operations are performed: performing startup detection on the electric compensation parameters of the display apparatus to obtain new values of the compensation parameters, and storing them in the memory.

In a shutdown operation stage of the display apparatus, the detection unit may determine whether it is necessary to perform shutdown detection on the electrical compensation parameters of the display apparatus; when it is necessary to perform shutdown detection on the electrical compensation parameters of the display apparatus, following shutdown operations are performed: performing shutdown detection on the electrical compensation parameters of the display apparatus to obtain updated values of the compensation parameters, and storing them in the memory.

During an operation of the display apparatus, the detection unit may also detect the electrical compensation parameters of the display apparatus according to sense time specified by a user, and obtain updated values of the compensation parameter, and store them in the memory.

In some exemplary implementation modes, the electrical compensation parameters include a threshold voltage and/or a mobility rate of a drive transistor of each pixel unit, and/or a threshold voltage of a light emitting element of each pixel unit.

In some exemplary implementation modes, the detection unit detects whether the currently displayed picture is a still picture, including: detecting whether there is a difference between data of the currently displayed picture and data of a first picture, or detecting whether a difference between data of the currently displayed picture and data of a first picture is less than a preset value, the first picture is an x-th frame picture before the currently displayed picture or a preset reference picture, and x is a natural number greater than or equal to 1.

Exemplarily, when x=1, the first picture is a picture of a first frame before the currently displayed picture. In the embodiment of the present disclosure, the detection unit may determine that the currently displayed picture is a still picture relative to a picture of a previous frame when it is detected that there is no difference between data of displayed pictures of two adjacent frames, or the detection unit may determine that the currently displayed picture is a still picture relative to a picture of a previous frame when it is detected that a difference between data of displayed pictures of two adjacent frames is less than a preset value.

In the embodiment of the present disclosure, the detection unit may respectively accumulate and sum all data of the currently displayed picture and all data of the first picture, detect whether there is a difference between data of the currently displayed picture and data of the first picture or detect whether a difference between the data of the currently displayed picture and the data of the first picture is less than a preset value, according to whether summation results are the same or a difference of the summation results. In this way, the detection unit may detect whether a picture is a still picture before the picture is displayed, however, the embodiment of the present disclosure is not limited thereto.

In the embodiment of the present disclosure, when the detection unit detects whether there is a difference between data of the currently displayed picture and data of the first picture or detect whether a difference between the data of the currently displayed picture and the data of the first picture is less than a preset value, the data of the currently displayed picture and the data of the first picture may be brightness data (or gray scale data), and a size of the preset value may be set according to an interval size of the brightness data, and the preset value may be, for example, 100.

In some exemplary implementation modes, the detection unit detects whether the currently displayed picture is a still picture, including: detecting whether there is a difference between data of the currently displayed picture and data of a first picture within a preset display region, or, detecting whether a difference between data of the currently displayed picture and data of the first picture is less than a preset value within a preset display region.

Exemplarily, the preset display region may be from an i1-th row to a j1-th row, wherein both i1 and j1 are natural numbers and j1>i1.

In the embodiment of the present disclosure, a size of the preset display region may be set as required. Exemplarily, the preset display region may also be from an i2-th column to a j2-th column, or the preset display region may also be a region surrounded by an i1-th row to a j1-th row and an i2-th column to a j2-th column, which is not limited in the embodiment of the present disclosure.

In some exemplary implementation modes, the detection unit detects whether the currently displayed picture is a still picture, including: for a sub-pixel of a preset color, detecting whether there is a difference between data of the currently displayed picture and data of the first picture, or, for a sub-pixel of a preset color, detecting whether a difference between data of the currently displayed picture and data of the first picture is less than a preset value.

Exemplarily, the sub-pixel of the preset color may be a sub-pixel of any color, such as a red sub-pixel, a green sub-pixel, a blue sub-pixel, or a white sub-pixel.

In some exemplary implementation modes, the detection unit is specifically configured to: detect whether a picture displayed in first display time is a still picture with respect to a first picture and whether a picture displayed in second display time is a still picture with respect to a second picture, wherein the first picture is a picture of an x-th frame before the picture displayed in the first display time or a preset reference picture, the second picture is a picture of an x-th frame before the picture displayed in the second display time or a preset reference picture, and x is a natural number greater than or equal to 1; when pictures displayed in the first display time and the second display time are both still pictures, send a first notification to the compensator; when any one of the pictures displayed in the first display time and the second display time is not a still picture, send a second notification to the compensator.

In some exemplary implementation modes, the compensator compensates the currently displayed picture according to the sense result of the sense compensation circuit in the blank time of the currently displayed picture, including: the compensator compensates the currently displayed picture (i.e., the picture displayed in the second display time) according to a sense result of the sense compensation circuit in blank time between the first display time and the second display time.

Figure 11:
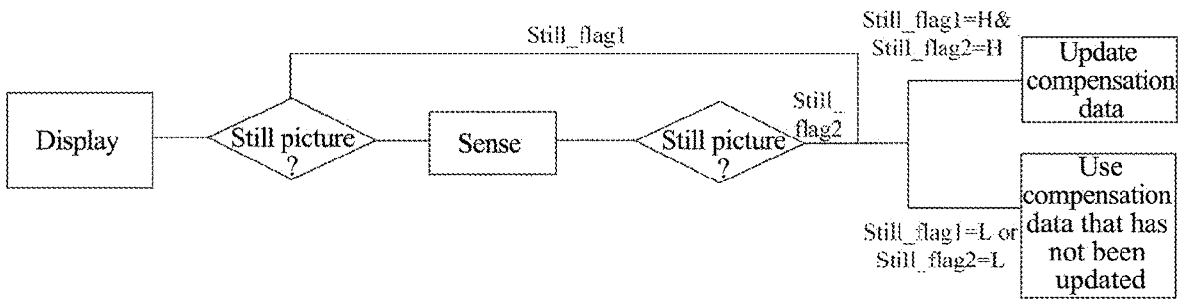
FIG. 11 is a display flowchart of yet another display panel according to an exemplary embodiment of the present disclosure.

FIG. 11 is a display flowchart of another display panel according to an embodiment of the present disclosure. When the display apparatus displays, it is determined whether a current picture is a still picture, and still_flag1 is marked; real time sense is performed in blank non-display time of each frame, still picture determination is performed again after the sense is finished, and still_flag2 is marked. If results of both determinations are that the current picture is a still picture (still_flag1 & still_flag2=H), compensation data is updated. If a result of one determination is that the current picture is a non-still picture (still_flag1=L or still_flag2=L), compensation data is updated and compensation data before updating is still used. In this solution of the embodiment, double still picture determination is performed, which may achieve a purpose of avoiding a problem of lateral fine stripes in a compensated displayed picture due to deviation of a real time sense result caused by a large data difference between adjacent frames due to sudden picture change in a sense start process and a sense end process.

Figure 12:
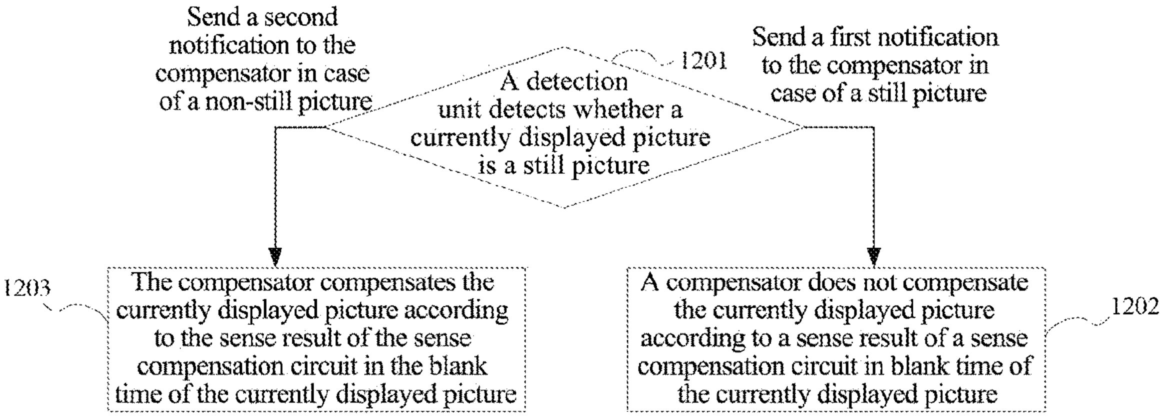
FIG. 12 is a schematic diagram of a display method of a display panel according to an exemplary embodiment of the present disclosure.

As shown in FIG. 12, an embodiment of the present disclosure also provides a display method of a display panel, the display panel includes a plurality of pixel units, at least one pixel unit includes a plurality of sub-pixels, at least one sub-pixel includes a pixel drive circuit, a sense compensation circuit, and an element to be driven, the display panel further includes: a detection unit and a compensator, the display method includes following acts.

In act 1201, the detection unit detects whether a currently displayed picture is a still picture, sends a first notification to the compensator when the currently displayed picture is a still picture, and sends a second notification to the compensator when the currently displayed picture is a non-still picture.

In act 1202, when the compensator receives the first notification, the compensator compensates the currently displayed picture according to a sense result of the sense compensation circuit in blank time of the currently displayed picture.

In act 1203, when the compensator receives the second notification, the compensator does not compensate the currently displayed picture according to the sense result of the sense compensation circuit in the blank time of the currently displayed picture.

In some exemplary implementation modes, the display method further includes following operations.

When the currently displayed picture is a non-still picture, the detection unit sends a third notification to a timing controller.

The timing controller receives the third notification and adjusts a clock signal timing output to a scan signal driver, so that the sense compensation circuit does not sense in the blank time of the currently displayed picture.

In other exemplary implementation modes, the detection unit may also not send a third notification to the timing controller when the currently displayed picture is a non-still picture; the timing controller still outputs to the scan signal driver according to a previously set clock signal timing, the sense compensation circuit senses electrical characteristics of the element to be driven in the blank time of the currently displayed picture, but the compensator does not compensate the currently displayed picture according to a sense result of the sense compensation circuit in the blank time of the currently displayed picture.

In some exemplary implementation modes, in the act 1203, when the compensator receives the second notification, the display method further includes: detecting whether a first sense result is stored in a memory, wherein the first sense result is a sense result of the sense compensation circuit in non-blank time before the currently displayed picture; and compensating the currently displayed picture using the first sense result when the first sense result is stored in the memory.

In some exemplary implementation modes, the non-blank time may be any of following: startup time, shutdown time, and user-specified time.

In some exemplary implementation modes, the detection unit detects whether the currently displayed picture is a still picture, including following operations.

The detection unit detects whether there is a difference between data of the currently displayed picture and data of a first picture, or detects whether a difference between the data of the currently displayed picture and the data of the first picture is less than a preset value, wherein the first picture is a picture of an x-th frame before the currently displayed picture or a preset reference picture, and x is a natural number greater than or equal to 1.

In some exemplary implementation modes, the detection unit detects whether the currently displayed picture is a still picture, including following operations.

The detection unit detects whether there is a difference between data of the currently displayed picture and data of a first picture within a preset display region, or, detects whether the difference between the data of the currently displayed picture and the data of the first picture is less than a preset value within the preset display region, wherein the first picture is a picture of an x-th frame before the currently displayed picture or a preset reference picture, and x is a natural number greater than or equal to 1.

In some exemplary implementation modes, the preset display region may be from an i-th row to a j-th row, both i and j are natural numbers, and j>i.

In some exemplary implementation modes, the detection unit detects whether the currently displayed picture is a still picture, including following operations.

For a sub-pixel of a preset color, the detection unit detects whether there is a difference between data of the currently displayed picture and data of a first picture, or, for a sub-pixel of a preset color, the detection unit detects whether the difference between the data of the currently displayed picture and the data of the first picture is less than a preset value, wherein the first picture is a picture of an x-th frame before the currently displayed picture or a preset reference picture, and x is a natural number greater than or equal to 1.

In some exemplary implementation modes, the sub-pixel of the preset color is a red sub-pixel, a green sub-pixel, a blue sub-pixel, or a white sub-pixel.

In some exemplary implementation modes, the act 1201 specifically includes following operations.

The detection unit detects whether a picture displayed in first display time is a still picture with respect to a first picture and whether a picture displayed in second display time is a still picture with respect to a second picture, wherein the first picture is a picture of an x-th frame before the picture displayed in the first display time or a preset reference picture, the second picture is a picture of an x-th frame before the picture displayed in the second display time or a preset reference picture, and x is a natural number greater than or equal to 1.

When pictures displayed in the first display time and the second display time are both still pictures, a first notification is sent to the compensator.

When any one of the pictures displayed in the first display time and the second display time is not a still picture, a second notification is sent to the compensator.

In some exemplary implementation modes, in the act 1202, the compensator compensates the currently displayed picture according to the sense result of the sense compensation circuit in the blank time of the currently displayed picture, including: the compensator compensates the currently displayed picture (i.e., a displayed picture after the blank time, i.e., the picture displayed in the second display time) according to a sense result of the sense compensation circuit in blank time between the first display time and the second display time.

An exemplary embodiment of the present disclosure also provides a display apparatus which includes the display panel according to any one of the aforementioned embodiments. The display panel of the present disclosure may be applied to a display apparatus with a pixel drive circuit and a sense compensation circuit, such as an OLED, a quantum dot display (QLED), a light emitting diode display (Micro LED or Mini LED), or a Quantum Dot Light Emitting Diode display (QDLED), which is not limited here in the present disclosure.

In the display apparatus of an embodiment of the present disclosure, it is determined whether a currently displayed picture is a still picture in a display process and a real time sense waveform or a real time sense result is adjusted according to a determination result, so as to shield a problem of lateral fine stripes in a displayed picture under a non-still picture caused by real time sense, thus a display effect is improved.

Although implementation modes disclosed in the present disclosure are described as above, the described contents are only implementation modes which are used for facilitating understanding of the present disclosure, but are not intended to limit the present disclosure. Any skilled person in the art to which the present disclosure pertains may make any modification and variation in forms and details of implementation without departing from the spirit and scope of the present disclosure. However, the patent protection scope of the present disclosure should be subject to the scope defined in the appended claims.

The invention claimed is:

1. A display panel, comprising a plurality of pixel units, at least one pixel unit comprises a plurality of sub-pixels, at least one sub-pixel comprises a pixel drive circuit, a sense compensation circuit, and an element to be driven, the display panel further comprises: a detection unit and a compensator;

the pixel drive circuit is configured to drive the element to be driven to emit light in active time;

the sense compensation circuit is configured to sense electrical characteristics of the element to be driven in blank time;

the detection unit is configured to detect whether a currently displayed picture is a still picture, and send a first notification to the compensator when the currently displayed picture is a still picture; and send a second notification to the compensator when the currently displayed picture is a non-still picture;

the compensator is configured to compensate the currently displayed picture according to a sense result of the sense compensation circuit in the blank time of the currently displayed picture upon receiving the first notification, and not compensate the currently displayed picture according to the sense result of the sense compensation circuit in the blank time of the currently displayed picture upon receiving the second notification.

2. The display panel according to claim 1, wherein not compensate the currently displayed picture according to the sense result of the sense compensation circuit in the blank time, comprises any of following cases:

the sense compensation circuit senses the electrical characteristics of the element to be driven in the blank time of the currently displayed picture, and the compensator does not compensate the currently displayed picture;

the sense compensation circuit senses the electrical characteristics of the element to be driven in the blank time of the currently displayed picture, the compensator compensates the currently displayed picture according to a first sense result, wherein the first sense result is a sense result of the sense compensation circuit in non-blank time before the currently displayed picture;

the sense compensation circuit does not sense the electrical characteristics of the element to be driven in the blank time of the currently displayed picture, and the compensator does not compensate the currently displayed picture; and the sense compensation circuit does not sense the electrical characteristics of the element to be driven in the blank time of the currently displayed picture, and the compensator compensates the currently displayed picture according to the first sense result.

3. The display panel according to claim 1, further comprising a timing controller, a scan signal driver, and a data signal driver, wherein the detection unit is further configured to send a third notification to the timing controller when the currently displayed picture is a non-still picture;

the timing controller is configured to output a clock signal and a scan start signal to the scan signal driver, and output a first data signal to the data signal driver, and is further configured to adjust a clock signal timing output to the scan signal driver upon receiving the third notification, so that the sense compensation circuit does not sense in the blank time of the currently displayed picture;

the data signal driver is configured to receive the first data signal output by the timing controller, convert the first data signal into a data voltage for charging a pixel of a pixel unit, and output the data voltage to a plurality of data lines;

the scan signal driver is configured to receive the clock signal and the scan start signal output by the timing controller, generate a scan signal according to the received clock signal and scan start signal, and output the scan signal to a plurality of scan signal lines.

4. The display panel according to claim 1, wherein the sense compensation circuit comprises a current integrator, a sampling switch, and an analog-to-digital converter, wherein one end of the current integrator is connected with a compensation signal line in the pixel drive circuit, and the other end of the current integrator is connected with a first path end of the sampling switch;

a second path end of the sampling switch is connected with a first end of the analog-to-digital converter, and a control end of the sampling switch receives a sampling signal;

a second end of the analog-to-digital converter is connected with the compensator.

5. The display panel according to claim 1, wherein the compensator compensates the currently displayed picture according to the sense result of the sense compensation circuit in the blank time of the currently displayed picture, comprising:

the compensator calculates a voltage difference value corresponding to an amount of charge according to the amount of charge flowing through the element to be driven acquired by the sense compensation circuit in the blank time of the currently displayed picture;

the compensator obtains a compensation gain value of the element to be driven according to the calculated voltage difference value.

6. The display panel according to claim 1, further comprising a memory, wherein the memory is configured to store a first sense result, and the first sense result is a sense result of the sense compensation circuit in non-blank time before the currently displayed picture;

when receiving the second notification, the compensator is further configured to: detect whether the memory stores the first sense result; and compensate the currently displayed picture using the first sense result when the first sense result is stored in the memory.

7. The display panel according to claim 6, wherein the non-blank time is any of following: startup time, shutdown time, and user-specified time.

8. The display panel according to claim 1, wherein the detection unit detects whether the currently displayed picture is a still picture, comprising:

it is detected whether there is a difference between data of the currently displayed picture and data of a first picture, or it is detected whether a difference between data of the currently displayed picture and data of a first picture is less than a preset value, the first picture is a picture of an x-th frame before the currently displayed picture or a preset reference picture, and x is a natural number greater than or equal to 1.

9. The display panel according to claim 8, wherein the detection unit respectively accumulates and sums all data of the currently displayed picture and all data of the first picture, detects whether there is a difference between the data of the currently displayed picture and the data of the first picture or whether the difference between the data of the currently displayed picture and the data of the first picture is less than the preset value, according to whether summation results are the same or a difference of the summation results.

10. The display panel according to claim 1, wherein the detection unit detects whether the currently displayed picture is a still picture, comprising:

it is detected whether there is a difference between data of the currently displayed picture and data of a first picture within a preset display region, or, it is detected whether a difference between data of the currently displayed picture and data of the first picture is less than a preset value within a preset display region, wherein the first picture is a picture of an x-th frame before the currently displayed picture or a preset reference picture, and x is a natural number greater than or equal to 1.

11. The display panel according to claim 10, wherein the preset display region is from an i-th row to a j-th row, both i and j are natural numbers, and j>i.

12. The display panel according to claim 1, wherein the detection unit detects whether the currently displayed picture is a still picture, comprising:

for a sub-pixel of a preset color, it is detected whether there is a difference between data of the currently displayed picture and data of a first picture, or, for a sub-pixel of a preset color, it is detected whether a difference between data of the currently displayed picture and data of the first picture is less than a preset value, wherein the first picture is a picture of an x-th frame before the currently displayed picture or a preset reference picture, and x is a natural number greater than or equal to 1.

13. The display panel according to claim 12, wherein the sub-pixel of the preset color is a red sub-pixel, a green sub-pixel, a blue sub-pixel, or a white sub-pixel.

14. The display panel according to claim 1, wherein the detection unit is specifically configured to:

detect whether a picture displayed in first display time is a still picture with respect to a first picture and whether a picture displayed in second display time is a still picture with respect to a second picture, wherein the first picture is a picture of an x-th frame before the picture displayed in the first display time or a preset reference picture, the second picture is a picture of an x-th frame before the picture displayed in the second display time or a preset reference picture, and x is a natural number greater than or equal to 1;

send the first notification to the compensator when pictures displayed in the first display time and the second display time are both still pictures;

send the second notification to the compensator when any one of the pictures displayed in the first display time and the second display time is not a still picture.

15. The display panel according to claim 14, wherein the compensator compensates the currently displayed picture according to the sense result of the sense compensation circuit in the blank time of the currently displayed picture, comprising: the compensator compensates the currently displayed picture according to a sense result of the sense compensation circuit in blank time between the first display time and the second display time.

16. A display apparatus, comprising: a display panel according to claim 1.

17. A display method of a display panel, wherein the display panel comprises a plurality of pixel units, at least one pixel unit comprises a plurality of sub-pixels, at least one sub-pixel comprises a pixel drive circuit, a sense compensation circuit, and an element to be driven, the display panel further comprises: a detection unit and a compensator, the display method comprises:

detecting, by the detection unit, whether a currently displayed picture is a still picture, sending a first notification to the compensator when the currently displayed picture is a still picture, and sending a second notification to the compensator when the currently displayed picture is a non-still picture;

compensating, by the compensator, the currently displayed picture according to a sense result of the sense compensation circuit in blank time of the currently displayed picture when the compensator receives the first notification;

not compensating, by the compensator, the currently displayed picture according to the sense result of the sense compensation circuit in the blank time of the currently displayed picture when the compensator receives the second notification.

18. The display method according to claim 17, wherein not compensating, by the compensator, the currently displayed picture according to the sense result of the sense compensation circuit in the blank time of the currently displayed picture, comprises any of following:

sensing, by the sense compensation circuit, electrical characteristics of the element to be driven in the blank time of the currently displayed picture, and not compensating, by the compensator, the currently displayed picture;

sensing, by the sense compensation circuit, the electrical characteristics of the element to be driven in the blank time of the currently displayed picture, compensating, by the compensator, the currently displayed picture according to a first sense result, wherein the first sense result is a sense result of the sense compensation circuit in non-blank time before the currently displayed picture;

not sensing, by the sense compensation circuit, the electrical characteristics of the element to be driven in the blank time of the currently displayed picture, and not compensating, by the compensator, the currently displayed picture; and not sensing, by the sense compensation circuit, the electrical characteristics of the element to be driven in the blank time of the currently displayed picture, and compensating, by the compensator, the currently displayed picture according to the first sense result.

19. The display method according to claim 17, wherein the detecting, by the detection unit, whether the currently displayed picture is a still picture, comprises any of following:

detecting whether there is a difference between data of the currently displayed picture and data of a first picture, or detecting whether a difference between data of the currently displayed picture and data of ta first picture is less than a preset value, wherein the first picture is a picture of an x-th frame before the currently displayed picture or a preset reference picture, and x is a natural number greater than or equal to 1;

detecting whether there is a difference between data of the currently displayed picture and data of a first picture within a preset display region, or, detecting whether a difference between data of the currently displayed picture and data of a first picture is less than a preset value within a preset display region;

for a sub-pixel of a preset color, detecting whether there is a difference between data of the currently displayed picture and data of a first picture, or, for a sub-pixel of a preset color, detecting whether a difference between data of the currently displayed picture and data of a first picture is less than a preset value.

20. The display method according to claim 17, wherein the detecting, by the detection unit, whether the currently displayed picture is a still picture, sending the first notification to the compensator when the currently displayed picture is a still picture, and sending the second notification to the compensator when the currently displayed picture is a non-still picture, comprises:

detecting, by the detection unit, whether a picture displayed in first display time is a still picture with respect to a first picture, and whether a picture displayed in second display time is a still picture with respect to a second picture, wherein the first picture is a picture of an x-th frame before the picture displayed in the first display time or a preset reference picture, the second picture is a picture of an x-th frame before the picture displayed in the second display time or a preset reference picture, and x is a natural number greater than or equal to 1;

sending, by the detection unit, a first notification to the compensator when pictures displayed in the first display time and the second display time are both still pictures;

sending, by the detection unit, a second notification to the compensator when any one of the pictures displayed in the first display time and the second display time is not a still picture.

* * * * *